United States Patent
Norbeck et al.

(10) Patent No.: US 8,268,026 B2
(45) Date of Patent: Sep. 18, 2012

(54) CONTROLLING THE SYNTHESIS GAS COMPOSITION OF A STEAM METHANE REFORMER

(75) Inventors: Joseph M. Norbeck, Riverside, CA (US); Chan Seung Park, Placentia, CA (US); Arun Sk Raju, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 68 days.

(21) Appl. No.: 11/879,241

(22) Filed: Jul. 16, 2007

(65) Prior Publication Data
US 2008/0021121 A1    Jan. 24, 2008

Related U.S. Application Data

(63) Continuation-in-part of application No. 11/489,298, filed on Jul. 18, 2006.

(51) Int. Cl.
*B01J 7/00* (2006.01)
*B01J 8/00* (2006.01)
*C01B 3/36* (2006.01)
*C01B 6/24* (2006.01)
*C01B 3/02* (2006.01)
*C01B 3/24* (2006.01)
*C10K 3/06* (2006.01)

(52) U.S. Cl. ............ 48/197 R; 48/61; 48/202; 48/210; 423/644; 423/648.1; 423/650; 422/625

(58) Field of Classification Search ............... 48/197 R, 48/61, 202, 210; 423/644, 648.1, 650; 422/625
See application file for complete search history.

(56) References Cited

U.S. PATENT DOCUMENTS
2,987,387 A   6/1974   Carkeek et al.
(Continued)

FOREIGN PATENT DOCUMENTS
EP   699651 A1 *   3/1996
(Continued)

OTHER PUBLICATIONS

Van der Laan, G.P., Thesis, University of Groningen, Netherlands, 1999.
(Continued)

*Primary Examiner* — Matthew Merkling
(74) *Attorney, Agent, or Firm* — Fish & Associates, PC

(57) ABSTRACT

A method for controlling the synthesis gas composition obtained from a steam methane reformer (SMR) that obtains its feedstock as product gas directly from a steam hydro-gasification reactor SHR). The method allows control of the $H_2/CO$ syngas ratio by adjusting the hydrogen feed and the water content of feedstock into a steam hydro-gasification reactor that supplies the SMR. The steam and methane rich product gas of the SHR is generated by means of hydro-gasification of a slurry of carbonaceous material and water. The mass percentages of the product stream at each stage of the process are calculated using a modeling program, such as the ASPEN PLUS™ equilibrium process. By varying the parameters of solid to water ratio and hydrogen to carbon ratio, a sensitivity analysis can be performed that enables one determine the optimum composition of the slurry feedstock to the SHR to obtain a desired syngas ratio output of the SMR. Thus one can adjust the hydrogen feed and the water content of feedstock into the SHR that supplies the SMR to determine the syngas ratio output of the SMR.

15 Claims, 7 Drawing Sheets

U.S. PATENT DOCUMENTS

| | | | |
|---|---|---|---|
| 3,847,567 A | 11/1974 | Kalina et al. | |
| 3,917,468 A | 11/1975 | Van den Berg et al. | |
| 3,926,775 A | 12/1975 | Schroeder | |
| 3,957,460 A | 5/1976 | Lee | |
| 3,985,519 A | 10/1976 | Kalina et al. | |
| 4,012,311 A | 3/1977 | Greene | |
| 4,073,698 A | 2/1978 | Blurton et al. | |
| 4,118,204 A | 10/1978 | Eakman et al. | |
| 4,158,697 A | 6/1979 | Cramer | |
| 4,211,540 A | 7/1980 | Netzer | |
| 4,244,706 A | 1/1981 | Forney et al. | |
| 4,341,530 A | 7/1982 | Loth et al. | |
| 4,348,487 A | 9/1982 | Goldstein et al. | |
| 4,372,755 A | 2/1983 | Tolman et al. | |
| 4,385,905 A | 5/1983 | Tucker et al. | |
| 4,394,239 A | 7/1983 | Kitzelmann et al. | |
| 4,397,888 A | 8/1983 | Yannopoulos et al. | |
| 4,483,691 A | 11/1984 | McShea et al. | |
| 4,526,903 A | 7/1985 | Cummings | |
| 4,560,547 A * | 12/1985 | Schora et al. | 423/650 |
| 4,597,776 A | 7/1986 | Ulman et al. | |
| 4,822,935 A | 4/1989 | Scott | |
| 4,833,171 A | 5/1989 | Sweeney | |
| 4,983,296 A | 1/1991 | McMahon et al. | |
| 5,250,175 A | 10/1993 | Des Ormeaus | |
| 5,344,848 A | 9/1994 | Steinberg et al. | |
| 5,427,762 A * | 6/1995 | Steinberg et al. | 423/449.1 |
| 5,439,580 A | 8/1995 | Akbar et al. | |
| 5,447,559 A | 9/1995 | Rao et al. | |
| 5,496,859 A | 3/1996 | Fong et al. | |
| RE35,377 E | 11/1996 | Steinberg et al. | |
| 5,656,044 A | 8/1997 | Bishop et al. | |
| 6,053,954 A | 4/2000 | Anderson et al. | |
| 6,225,358 B1 | 5/2001 | Kennedy | |
| 6,257,980 B1 | 7/2001 | Roden et al. | |
| 6,350,288 B1 | 2/2002 | Hirayama et al. | |
| 6,495,610 B1 | 12/2002 | Brown | |
| 6,612,269 B2 | 9/2003 | Heffel et al. | |
| 7,208,530 B2 | 4/2007 | Norbeck et al. | |
| RE40,419 E | 7/2008 | Norbeck et al. | |
| 2002/0095867 A1 | 7/2002 | Katayama | |
| 2003/0022035 A1 | 1/2003 | Galloway | |
| 2005/0032920 A1 | 2/2005 | Norbeck et al. | |
| 2005/0165261 A1 | 7/2005 | Abazzajiian et al. | |
| 2005/0256211 A9 | 11/2005 | Weers et al. | |
| 2005/0256212 A1 | 11/2005 | Norbeck et al. | |
| 2008/0021123 A1 | 1/2008 | Norbeck et al. | |

FOREIGN PATENT DOCUMENTS

| | | | |
|---|---|---|---|
| EP | 0 952 132 | | 10/1999 |
| WO | WO 03/066517 | * | 8/2003 |
| WO | WO03/066517 A1 | | 8/2003 |
| WO | PCT/US2007/021594 | | 10/2007 |

OTHER PUBLICATIONS

Sheldon, R.A. Chemicals from Synthesis Gas, 1983.

Steynberg, A.; Dry, M., FT Technology Studies in surf Science and Catalysis, ec., vol. 152, 2005.

A.S.K. Raju, C.S. Park and J.M. Norbeck, Synthesis Gas Production using Steam Hydrogasification and Steam Reforming, Accepted, Fuel Proc. Tech., 2008.

V.P. Natarajan and G.J. Supes, Rheological studies on a slurry biofuel to aid in evaluating its suitability as a fuel, Fuel, vol. 76, 1997, pp. 1527-2535.

G. Atesok, F. Boylu, A.A. Sirkeci and H. Dincer, The effect of coal properties on the viscosity of coal-water slurries, Fuel, vol. 81, 2002, pp. 1855-1858.

F. Boylu, H. Dincer and G. Atesok, Effect of coal particle size distribution, volume fraction and rank on the rheology of coal-water slurries, Fuel Proc. Tech., vol. 85, 2004, pp. 241-250.

N. V. Pimenova and T. R. Hanley, Measurement of rheological properties of corn stover susspensions, App. Biochem. and Biotech., vol. 105-108, 2003, pp. 383-392.

H. A. Barnes and Q. D. Nguyen, Rotating vane rheometry—a review, J. Non-Newtonian Fluid Mech. vol. 98, 2001, pp. 1-14.

N. I. Heywood, Stop your slurries from stirring up trouble, Chem. Engr Proc. vol. 95, 1999, pp. 21-40.

S. K. Majumder, K. Chandna, D. S. De and G. Kundu, Studies on flow characteristics of coal-oil-water slurry system, Int. J of Miner. Proc., vol. 79, 2006, pp. 217-224.

Ayhan Demirbas, Thermochemical Conversion of Biomass to Liquid Products in the Aqueous Medium, *Energy Sources*, 27:1235-1243, 2005.

Kreda, Silvia et al, G-protein-coupled receptors as targets for gene transfer vectors using natural small-molecular ligands, *Nature Biotechnology*, vol. 18 Jun. 2000.

* cited by examiner

CONTROLLING THE SYNTHESIS GAS COMPOSITION OF A STEAM METHANE REFORMER

CROSS-REFERENCE TO RELATED APPLICATIONS

This application is a continuation-in-part of, and claims the benefit of, patent application Ser. No. 11/489,298, filed Jul. 18, 2006.

FIELD OF THE INVENTION

The field of the invention is the production of synthesis gas.

BACKGROUND OF THE INVENTION

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting. Alternatively, one can use coal as a feedstock to upgrade low grade dirty solid fuel to a value added convenient clean liquid fuel, such as high quality, environment friendly synthetic diesel or other hydrocarbon fuels.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gas (a mixture of hydrogen and carbon monoxide, also referred to as "syngas") cleanly and efficiently from carbonaceous sources, that can be subjected to a Fischer-Tropsch type process to produce clean and valuable synthetic gasoline and diesel fuels, will benefit both the transportation sector and the health of society. A Fischer-Tropsch type process or reactor, which is defined herein to include respectively a Fischer-Tropsch process or reactor, is any process or reactor that uses synthesis gas to produce a liquid fuel. Similarly, a Fischer-Tropsch type liquid fuel is a fuel produced by such a process or reactor. A Fischer-Tropsch type process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch type liquid fuels, produced from synthesis gas, are sulfur-free, aromatic free, and in the case of synthetic diesel fuel have an ultrahigh cetane value.

Biomass material is the most commonly processed carbonaceous waste feed stock used to produce renewable fuels. Waste plastic, rubber, manure, crop residues, forestry, tree and grass cuttings and biosolids from waste water (sewage) treatment are also candidate feed stocks for conversion processes. Biomass feed stocks can be converted to produce electricity, heat, valuable chemicals or fuels. California tops the nation in the use and development of several biomass utilization technologies. Each year in California, more than 45 million tons of municipal solid waste is discarded for treatment by waste management facilities. Approximately half this waste ends up in landfills. For example, in just the Riverside County, California area, it is estimated that about 4000 tons of waste wood are disposed of per day. According to other estimates, over 100,000 tons of biomass per day are dumped into landfills in the Riverside County collection area. This municipal waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30-$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is a simple example of using biomass to produce heat energy. Unfortunately, open burning of biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gas for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming. In the future, these co-production processes could provide clean-burning fuels for a renewable fuel economy that could be sustained continuously.

A number of processes exist to convert biomass and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

Synthesis gas can be produced through one of two major chemical processes, steam reforming and partial oxidation. Steam reforming is used when the feed consists of light hydrocarbons such as natural gas, and when hydrogen is the main product. Partial oxidation is used with heavier feeds, or when a relatively high yield of carbon monoxide is desired. Table 1 summarizes various commercial processes under operation for the production of synthesis gas [1].

TABLE 1

| Chemical Process | Feedstock | Syngas Ratio ($H_2$/Co, mole) |
|---|---|---|
| Steam Reforming | Natural gas, steam | 4.76 |
| Steam Reforming | Methane, steam | 3 |
| Steam Reforming | Naptha, steam | 2 |
| Steam Reforming | Natural gas, $CO_2$, steam | 2 |
| Partial Oxidation | Coal, steam, $O_2$ | 0.68 |
| Partial Oxidation | Coal, steam, $O_2$ | 0.46 |
| Partial Oxidation | Coal, steam, $O_2$ | 2.07 |

The ratio of hydrogen to carbon monoxide in the synthesis gas is called the syngas ratio and is strongly dependent on the process used and the nature of the feedstock.

Syngas is used as a feedstock in the manufacture of various chemicals and also in the gas-to-liquid processes, which use the Fischer-Tropsch type synthesis (FTS) to produce liquid fuels. Alternatively, syngas can be used in the so called integrated gasification combined cycle, where it is directly burned with air to produce the heat necessary to operate steam turbines used in electricity generation. Depending on the desired usage, the $H_2$/Co ratio of syngas needs to be adjusted. Table 2 summarizes the optimum syngas ratios required for different processes [2].

TABLE 2

| Desired Product | Chemical Process | Syngas Ratio Required ($H_2$/Co, mole) |
|---|---|---|
| Synthetic fuels | FTS - Co catalyst | 2.05-2.15 |
| Synthetic fuels | FTS - Fe catalyst | 1.65 |
| Methanol | | 2 |
| Ethylene glycol | | 1.5 |
| Acetic acid | | 1 |
| Benzene-toluene-xylene | | 1.5 |

In general, the syngas ratio can be lowered by using the pressure swing adsorption process or by using hydrogen membrane systems. Alternatively, adding a downstream water-gas shift reactor can increase the syngas ratio.

A process was developed in our laboratories to produce synthesis gas in which a slurry of particles of carbonaceous material in water, and hydrogen from an internal source, are fed into a hydro-gasification reactor under conditions to generate rich producer gas. This is fed along with steam into a steam pyrolytic reformer under conditions to generate synthesis gas. This process is described in detail in Norbeck et al. U.S. patent application Ser. No. 10/503,435 (published as US 2005/0256212), entitled: "Production Of Synthetic Transportation Fuels From Carbonaceous Material Using Self-Sustained Hydro-Gasification." In a further version of the process, using a steam hydro-gasification reactor (SHR) the carbonaceous material is heated simultaneously in the presence of both hydrogen and steam to undergo steam pyrolysis and hydro-gasification in a single step. This process is described in detail in Norbeck et al. U.S. patent application Ser. No. 10/911,348 (published as US 2005/0032920), entitled: "Steam Pyrolysis As A Process to Enhance The Hydro-Gasification of Carbonaceous Material." The disclosures of U.S. patent application Ser. Nos. 10/503,435 and 10/911,348 are incorporated herein by reference.

Producing synthesis gas via gasification and producing a liquid fuel from synthesis gas are totally different processes. Of particular interest to the present invention is the production of synthesis gas using a steam methane reformer (SMR), a reactor that is widely used to produce synthesis gas for the production of liquid fuels and other chemicals. The reactions taking place in the SMR can be written as follows.

$$CH_4 + H_2O \rightarrow CO + 3H_2 \qquad (1)$$

or $$CH_4 + 2H_2O \rightarrow CO_2 + 4H_2 \qquad (2)$$

Carbon monoxide and hydrogen are produced in the SMR by using steam and methane as the feed. Heating process water in a steam generator produces the required steam. The methane is usually supplied in the form of compressed natural gas, or by means of a light molecular weight off-gas stream from a chemical or refinery process.

BRIEF SUMMARY OF THE INVENTION

This invention provides an improved, economical method to control the synthesis gas composition obtained from a steam methane reformer that obtains its feedstock as product gas directly from a steam hydro-gasification reactor. The method allows control of the $H_2$/CO ratio by adjusting the hydrogen feed and the water content of feedstock into the SHR that supplies the SMR.

One of two methods are used to adjust the hydrogen feed. In one embodiment, the hydrogen is obtained by diverting a portion of hydrogen separated from the synthesis gas to the slurry water. In another, preferred embodiment, the hydrogen is obtained by diverting a portion of the synthesis gas itself to the slurry water, without separating hydrogen from the synthesis gas, By controlled recycling, using a portion of the synthesis gas, a steady state desired $H_2/H_2O$ ratio is obtained, which occurs quite rapidly.

As described above, the steam and methane rich product gas of the SHR is generated by means of hydro-gasification of the slurry, which is a mixture of carbonaceous material and water. This product gas, a mixture of methane rich gas and steam, where the steam is present as a result of the superheating the water in the feedstock, serves as an ideal feed stream for the SMR. Impurities are removed from the SHR product stream, such as fine particles of ash & char, hydrogen sulfide and other inorganic components.

The mass percentages of the product stream at each stage of the process are calculated using a modeling program, such as the ASPEN PLUS™ equilibrium process that can relate the synthesis gas ratio of hydrogen to carbon monoxide to conversion ratios of the carbon content of the carbonaceous material. In accordance with the invention, by varying the parameters of solid to water ratio and hydrogen to carbon ratio, a sensitivity analysis can be performed that enables one determine the optimum composition of the slurry feedstock to the SHR to obtain a desired syngas ratio output of the SMR. Thus, the ratio of hydrogen to slurry water is determined by analysis of the effect on the synthesis gas ratio of (a) the ratio of solid content of the carbonaceous material to the slurry water and (b) the ratio of the hydrogen to carbon content of the carbonaceous material. This enables one to adjust the hydrogen feed and the water content of feedstock into the SHR that supplies the SMR to provide the desired ratio of hydrogen to carbon monoxide in the synthesis gas output of the SMR.

More particularly, a process is provided for converting carbonaceous material to synthesis gas, comprising simultaneously heating carbonaceous material in an SHR in the presence of a predetermined ratio of hydrogen and water in the form of steam, at a temperature and pressure sufficient to generate a stream of methane and carbon monoxide rich gas product, which can be called a producer gas. Impurities are removed from the producer gas stream substantially at the process temperature and pressure, and the resultant producer gas is subjected to steam methane reforming in an SMR under conditions whereby synthesis gas comprising hydrogen and carbon monoxide is generated having a hydrogen/carbon monoxide ratio determined by the ratio of hydrogen and water in the SHR. While the hydrogen can be obtained by diverting a portion of hydrogen separated from the synthesis gas to the slurry water, it is preferred to obtain the hydrogen by diverting a portion of the synthesis gas itself, without separation of hydrogen from the synthesis gas, to the slurry water.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
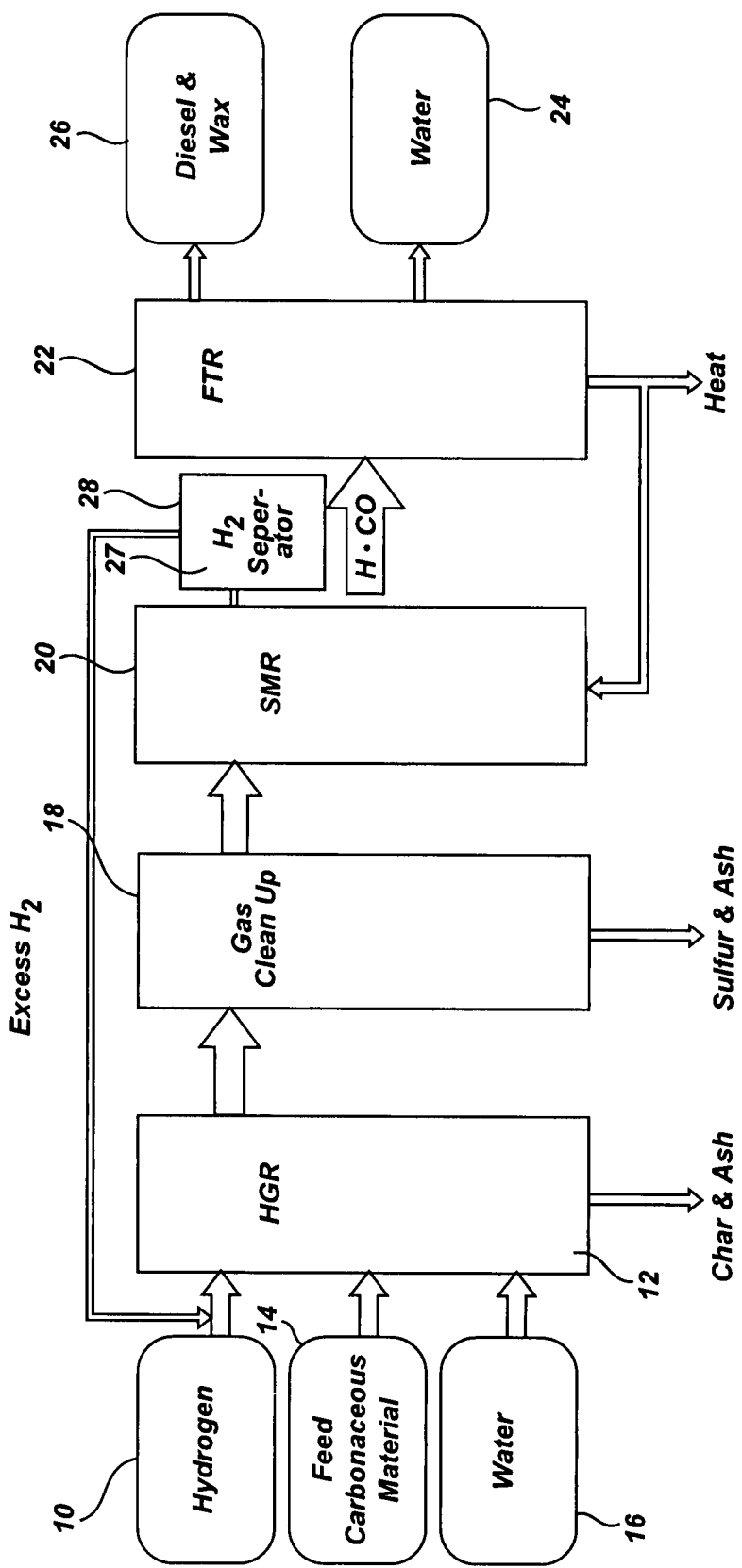
FIG. 1 is a flow diagram of the process of this invention in accordance with a first embodiment in which hydrogen is separated from a portion of the SMR output and recirculated.

This invention enables one to control of the $H_2/CO$ ratio output of an SMR by adjusting the hydrogen feed and the water content of feedstock into the SHR that supplies the SMR. The steam and methane rich product gas of the SHR is generated by means of hydro-gasification of the slurry, which is a mixture of carbonaceous material and water. This product gas, a mixture of methane rich gas and steam, where the steam is present as a result of the superheating the water in the feedstock, serves as an ideal feed stream for the SMR.

The mass percentages of the product stream at each stage of the process are calculated using a modeling program, such as the ASPEN PLUS™ equilibrium process. By varying the parameters of solid to water ratio and hydrogen to carbon ratio, a sensitivity analysis can be performed that enables one determine the optimum composition of the slurry feedstock to the SHR to obtain a desired syngas ratio output of the SMR. Thus one can adjust the hydrogen feed and the water content of feedstock into the SHR that supplies the SMR to determine the syngas ratio output of the SMR.

Impurities are removed from the SHR product stream, such as fine particles of ash & char, hydrogen sulfide and other inorganic components. These impurities must be removed in order to prevent poisoning of the catalyst used in the SMR. Conventionally, a combination of particulate filters, a solvent wash (amines, Selexol™, Rectisol™), and hydro-desulphurization by means of the Claus process are used for this purpose. In the Claus process, $H_2S$ is partially oxidized with air in a reaction furnace at high temperatures (1000-1400° C.). Sulfur is formed, but some $H_2S$ remains unreacted, and some $SO_2$ is made requiring that the remaining $H_2S$ be reacted with the $SO_2$ at lower temperatures (about 200-350° C.) over a catalyst to make more sulfur. To maintain the SMR feed stream at high temperatures, a gas cleanup unit is provided that operates at process pressures and at a temperature above the steam condensation point. The unit is located between the SHR and SMR.

More particularly, a process is provided for converting carbonaceous material to synthesis gas of a desired $H_2/CO$ ratio, comprising simultaneously heating carbonaceous material in an SHR in the presence of a predetermined ratio of hydrogen and water in the form of steam, at a temperature and pressure sufficient to generate a stream of methane and carbon monoxide rich gas product, which can be called a producer gas, the ratio of hydrogen and water being determined by a modeling program, such as the ASPEN PLUS™ equilibrium process. In accordance with the invention, by varying the parameters of solid to water ratio and hydrogen to carbon ratio, a sensitivity analysis is performed that enables one determine the optimum composition of the slurry feedstock to the SHR to obtain a desired syngas ratio output of the SMR. Impurities are removed from the producer gas stream substantially at the process temperature and pressure, and the resultant producer gas is subjected to steam methane reforming in an SMR under conditions whereby synthesis gas comprising hydrogen and carbon monoxide is generated having a hydrogen/carbon monoxide ratio determined by the ratio of hydrogen and water in the SHR.

In a specific process, for converting municipal waste, biomass, wood, coal, or a natural or synthetic polymer to synthesis gas, the carbonaceous material is simultaneously heated in the presence of both hydrogen and steam, at a temperature of about 700° C. to about 900° C. and pressure about 132 psi to 560 psi whereby to generate a stream of methane and carbon monoxide rich producer gas. Impurities are removed from the producer gas stream substantially at the process temperature and pressure, following which the resultant producer gas is subjected to steam methane reforming under conditions whereby to generate the desired synthesis gas ratio of hydrogen and carbon monoxide. For example, the required $H_2$:CO mole ratio of a Fischer-Tropsch type reactor with a cobalt based catalyst is 2.1:1. By appropriate adjustment, as described below, of the $H_2/H_2O$ ratio, a $H_2/CO$ mole ratio range of about 3 to 1 can be achieved to provide an excess of hydrogen, which can be fed into the SHR to make a self-sustainable process, i.e., without requiring any external hydrogen feed. The synthesis gas generated by the steam methane reforming can be fed into a Fischer-Tropsch type reactor under conditions whereby a liquid fuel is produced. Exothermic heat from the Fischer-Tropsch type reaction can be transferred to the hydro-gasification reaction and/or steam methane reforming reaction.

In one embodiment, the hydrogen is obtained by diverting a portion of hydrogen separated from the synthesis gas to the slurry water. In another, preferred embodiment, the hydrogen is obtained by diverting a portion of the synthesis gas itself to the slurry water, without separation of hydrogen from the synthesis gas. By controlled recycling, using a portion of the synthesis gas, a steady state desired $H_2/H_2O$ ratio is obtained, which occurs quite rapidly.

Example 1

FIG. 1 is a flow diagram a SHR to SMR process one embodiment of the invention in which a desired $H_2/CO$ ratio output of an SMR is, obtained by separating hydrogen from the SMR output, diverting it to the HGR, and adjusting the hydrogen feed and the water content of feedstock into the SHR that supplies the SMR. An internally generated hydrogen feed 10 is fed into an SHR 12 along with a carbonaceous feedstock 14 and water 16, which are heated to 750° C. at 400 psi in the SHR 12. The resulting producer gas is directed to a gas clean up filter 18, e.g. a candle filter assembly, at about 350° C. at about 400 psi. From there, after removal of sulfur and ash, the effluent is directed to an SMR 20 where synthesis gas is generated and fed to a Fischer-Tropsch type reactor 22, from which pure water 24, and diesel fuel and/or wax 26 is obtained. The SMR 20 output is passed through a hydrogen separator 27 where a portion of its hydrogen is separated and diverted from the SMR 20, at 28 to be fed back to the HGR 12. Heat 30 from the Fischer-Tropsch type reactor 22 is used to supplement the heat at the SMR.

Operating the unit above the bubbling temperature of the water allows the water to be present as steam in the gaseous product stream from the SHR, thereby enabling the process to retain most of the sensible heat in the effluent stream. The following example will illustrate the invention.

Figure 2:
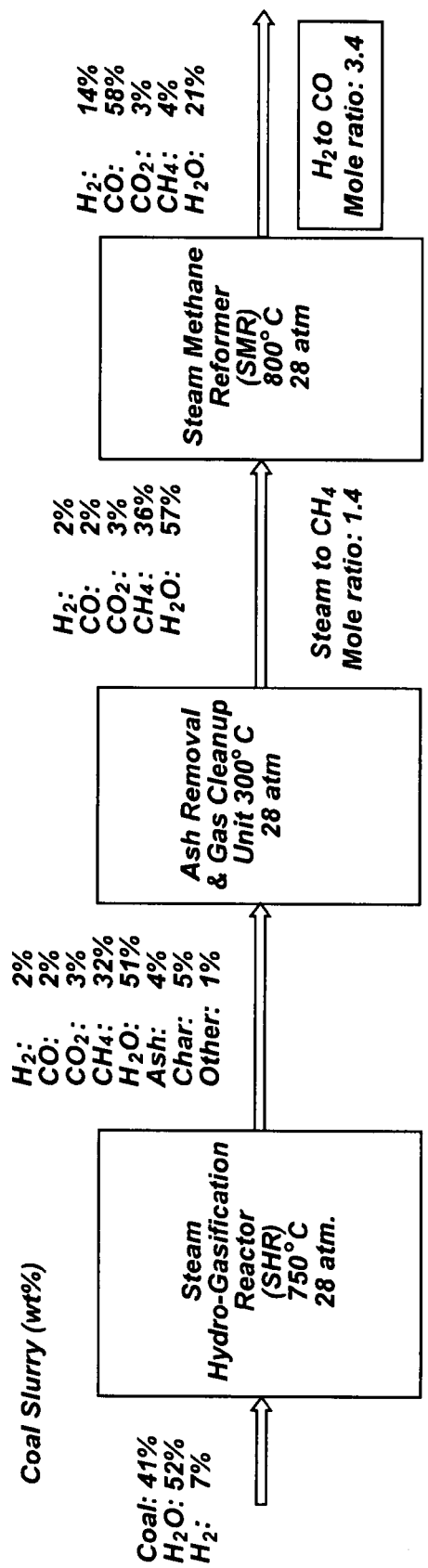
FIG. 2 is a flow diagram of the mass balance of the process of the first embodiment.

A mass balance process flow diagram is shown in FIG. 2. The mass percentages of the product stream at each stage of the process are provided in the figure. ASPEN PLUS™ equilibrium process modeling was used to calculate these values. ASPEN PLUS™ is a commercial computer modeling program that allows a process model to be created by specifying the chemical components and operating conditions. The program takes all of the specifications and simulates the model, executing all necessary calculations needed to solve the outcome of the system, hence predicting its behavior. When the calculations are complete, ASPEN PLUS™ lists the results, stream by stream and unit by unit, and can present the data in graphical form with determining ordinate and abscissa.

As shown in FIG. 2, an SHR feedstock of hydrogen and 41% coal slurry results in the production of synthesis gas with a 3.4:1 mole ratio of hydrogen to carbon monoxide in the SMR. The required feed hydrogen for the SHR can be supplied through external means or by internal feedback of a portion of the hydrogen produced in the SMR. In a particular example, a slurry of 41% coal, 52% water and 7% hydrogen is used, obtained following the procedures of Norbeck et al. U.S. Ser. No. 10/911,348. This results in an output from the SHR to the cleanup filter of a gaseous mixture containing 32 wt % $CH_4$, 2 wt % $H_2$, 2 wt % CO, 3 wt % $CO_2$, 51 wt % $H_2O$, 4 wt % ash, 5 wt % char, and 1 wt % other impurities.

The output of the SHR-cleanup unit is a methane rich, producer gas containing 36 wt % $CH_4$, 2 wt % $H_2$, 2 wt % CO, 3 wt % $CO_2$, and 57 wt % $H_2O$, having a steam to methane mole ratio of 1:4. The output of the SHR is fed to the SMR, which is operating at 800° C. and 28 atmospheres to yield synthesis gas having a mole ratio of $H_2$ to CO of 3.4, and containing 4 wt % $CH_4$, 14 wt % $H_2$, 58 wt % CO, 3 wt % $CO_2$, and 21 wt % $H_2O$.

Example 2

Figure 3:
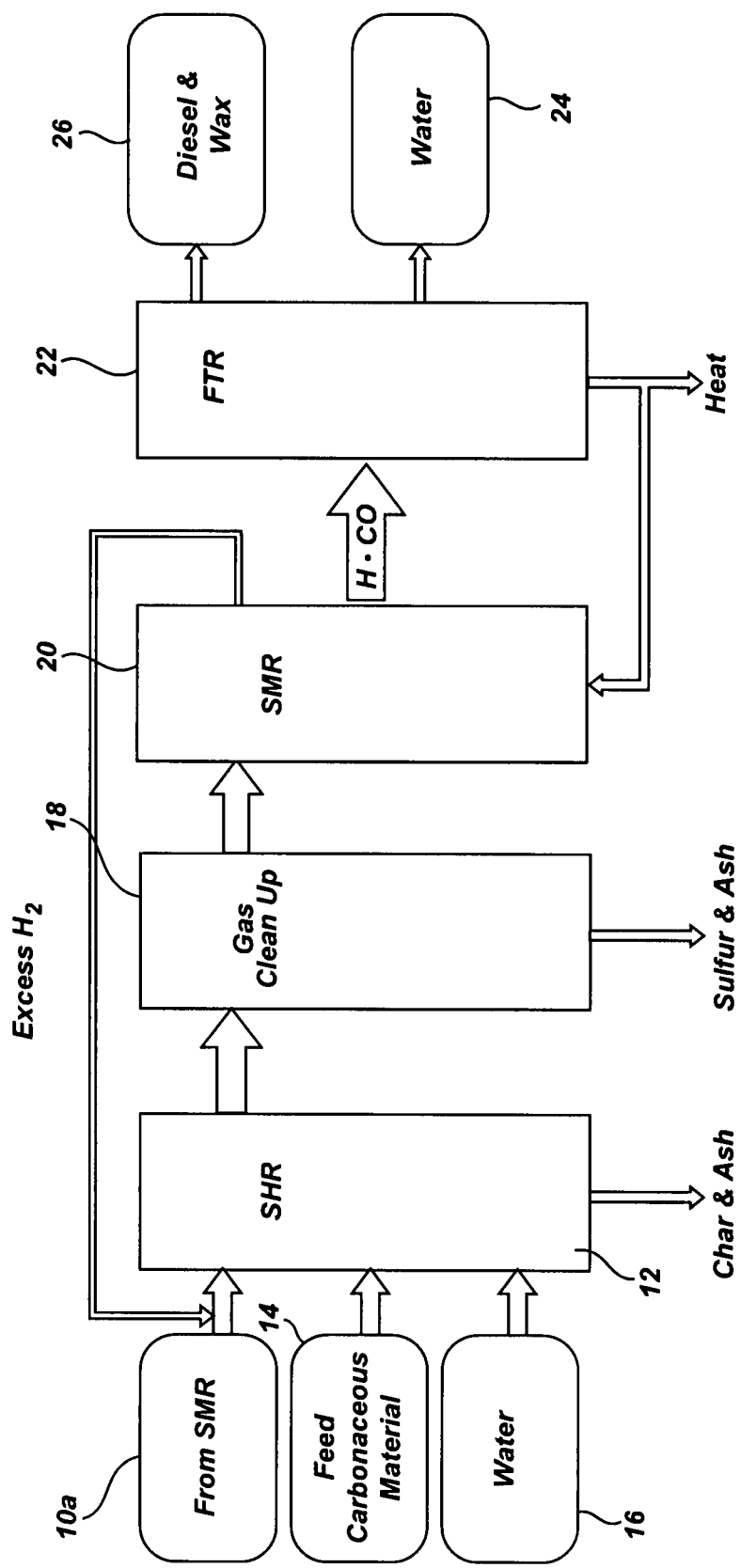
FIG. 3 is flow diagram of the process of this invention in accordance with a second embodiment where a portion of the output of the SMR is itself recycled without separation of its hydrogen.
Figure 4:
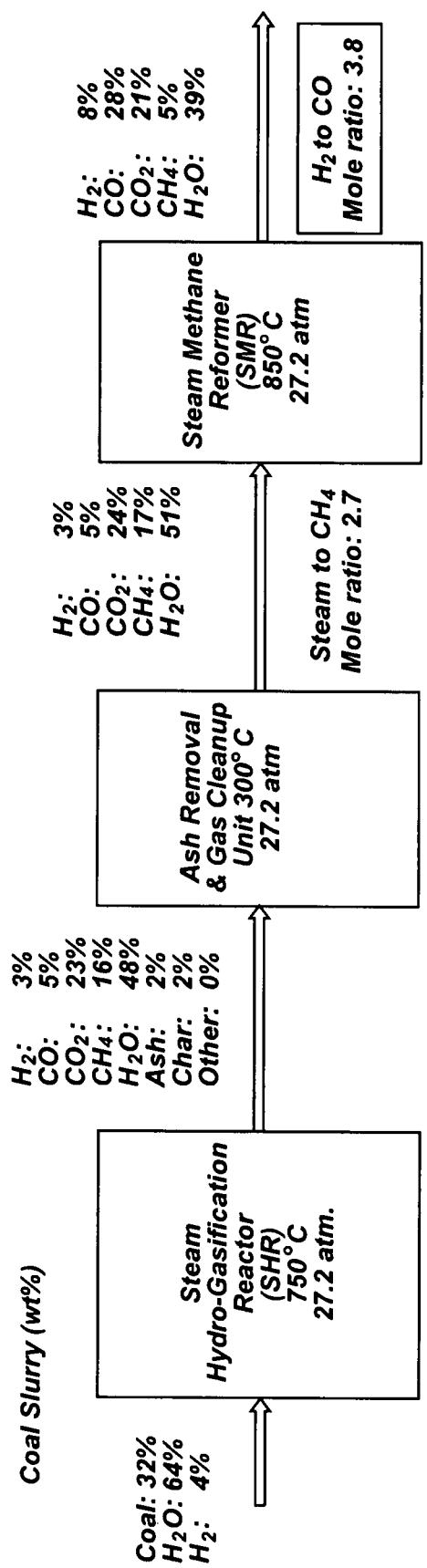
FIG. 4 is flow diagram of the mass balance of the process in accordance with the second embodiment before recycling of a portion of the SMR.

This Example, shown in FIGS. 3-6, illustrates a second, preferred embodiment in which a portion of the output of the SMR is itself recycled. FIG. 3 is flow diagram of the SHR to SMR process in which a desired $H_2/CO$ ratio output of an SMR is obtained by without separating hydrogen from the SMR output, but diverting a portion of the SMR output itself to the HGR, and adjusting the hydrogen feed and the water content of feedstock into the SHR that supplies the SMR. The process is the same as described in Example 1 but for those changes reflecting the direct use of a portion of the SMR as feed to the SHR. Accordingly, while some hydrogen is used to start the process, as shown in FIG. 4, discussed below, internally generated hydrogen feed is that component of the SMR output, as shown at 10a in FIG. 3. As in Example 1, the SMR portion 10a is fed into an SHR 12 along with a carbonaceous feedstock 14 and water 16, which are heated to 750° C. at 400 psi in the SHR 12. The resulting producer gas is directed to the gas clean up filter 18, and from there, after removal of sulfur and ash, the effluent is directed to the SMR 20 where synthesis gas is generated and fed to a Fischer-Tropsch type reactor 22, from which pure water 24, and diesel fuel and/or wax 26 is obtained.

In contrast to Example 1, the SMR 20 output is not passed through a hydrogen separator, but a portion, indicated at 28a is directly diverted from the SMR 20 to be fed back to the HGR 12. as in Example 1, heat 30 from the Fischer-Tropsch type reactor 22 is used to supplement the heat at the SMR.

A mass balance process flow diagram for the initial run is shown in FIG. 4. as in Example 1, the mass percentages of the product stream at each stage of the process are provided in the figure, obtained using ASPEN PLUS™ equilibrium process modeling.

As shown in FIG. 4, an initial SHR slurry feedstock containing 4% hydrogen, 32% coal, and 64% water results in the production of synthesis gas with a 3.8:1 mole ratio of hydrogen to carbon monoxide in the SMR. This results in an output from the SHR to the cleanup filter of a gaseous mixture containing 16 wt % $CH_4$, 3 wt % $H_2$, 5 wt % CO, 23 wt % $CO_2$, 48 wt % $H_2O$, 2 wt % ash, 2 wt % char, and 0 wt % other impurities.

The output of the SHR-cleanup unit is a gas containing 17 wt % $CH_4$, 3 wt % $H_2$, 5 wt % CO, 24 wt % $CO_2$, and 51 wt % $H_2O$, having a steam to methane mole ratio of 2:7. The output of the SHR is fed to the SMR, which is operating at 850° C. and 27.2 atmospheres to yield synthesis gas having a mole ratio of $H_2$ to CO of 3.8, and containing 5 wt % $CH_4$, 8 wt % $H_2$, 28 wt % CO, 21 wt % $CO_2$, and 39 wt % $H_2O$.

Figure 5:
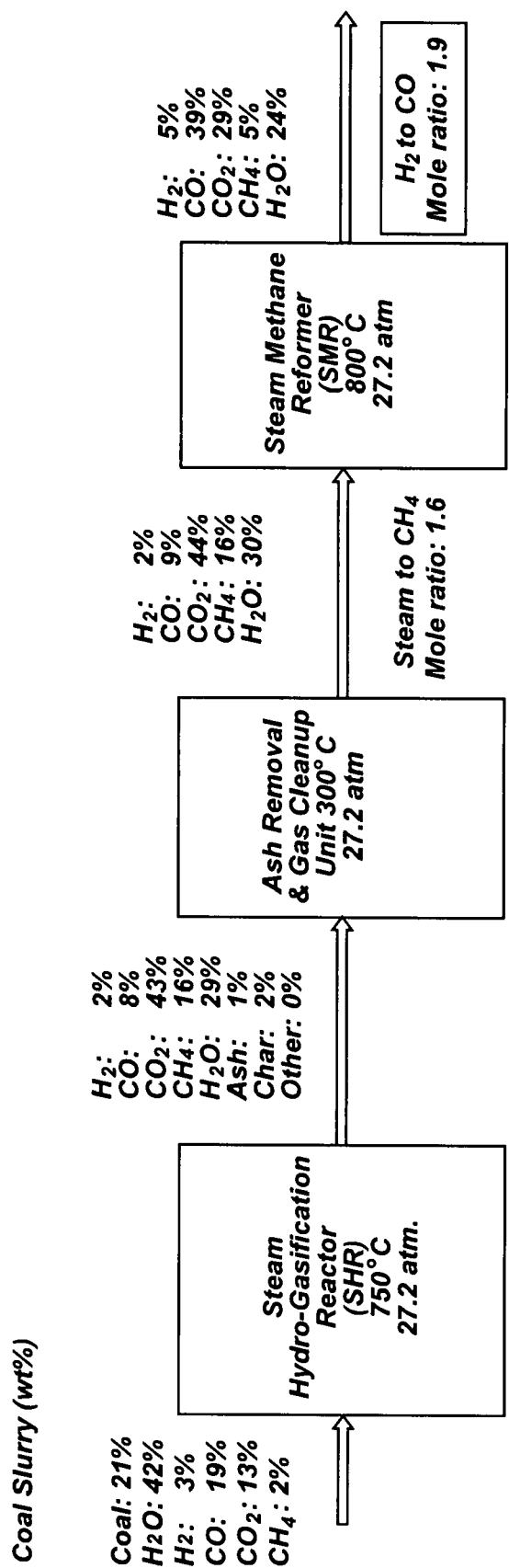
FIG. 5 is flow diagram of the mass balance of the process in accordance with the second embodiment after recycling a portion of the SMR.

FIG. 5 shows a mass balance flow diagram after 12 recycle runs where it reached a final steady $H_2/CO$ exit ratio. The steady state feedstock contained 3% hydrogen, 21% coal, 42% water, 19% CO, 13% $CO_2$, and 2% $CH_4$, resulting in the production of synthesis gas with a 1.9:1 mole ratio of hydrogen to carbon monoxide in the SMR. This results in an output from the SHR to the cleanup filter of a gaseous mixture containing 16 wt % $CH_4$, 2 wt % $H_2$, 8 wt % CO, 43 wt % $CO_2$, 29 wt % $H_2O$, 1 wt % ash, 2 wt % char, and 0 wt % other impurities.

The output of the SHR-cleanup unit is a gas containing 16 wt % $CH_4$, 2 wt % $H_2$, 9 wt % CO, 44 wt % $CO_2$, and 30 wt % $H_2O$, having a steam to methane mole ratio of 1.6. The output of the SHR is fed to the SMR to yield synthesis gas having a mole ratio of $H_2$ to CO of 1.9, and containing 5 wt % $CH_4$, 5 wt % $H_2$, 39 wt % CO, 26 wt % $CO_2$, and 24 wt % $H_2O$.

Figure 6:
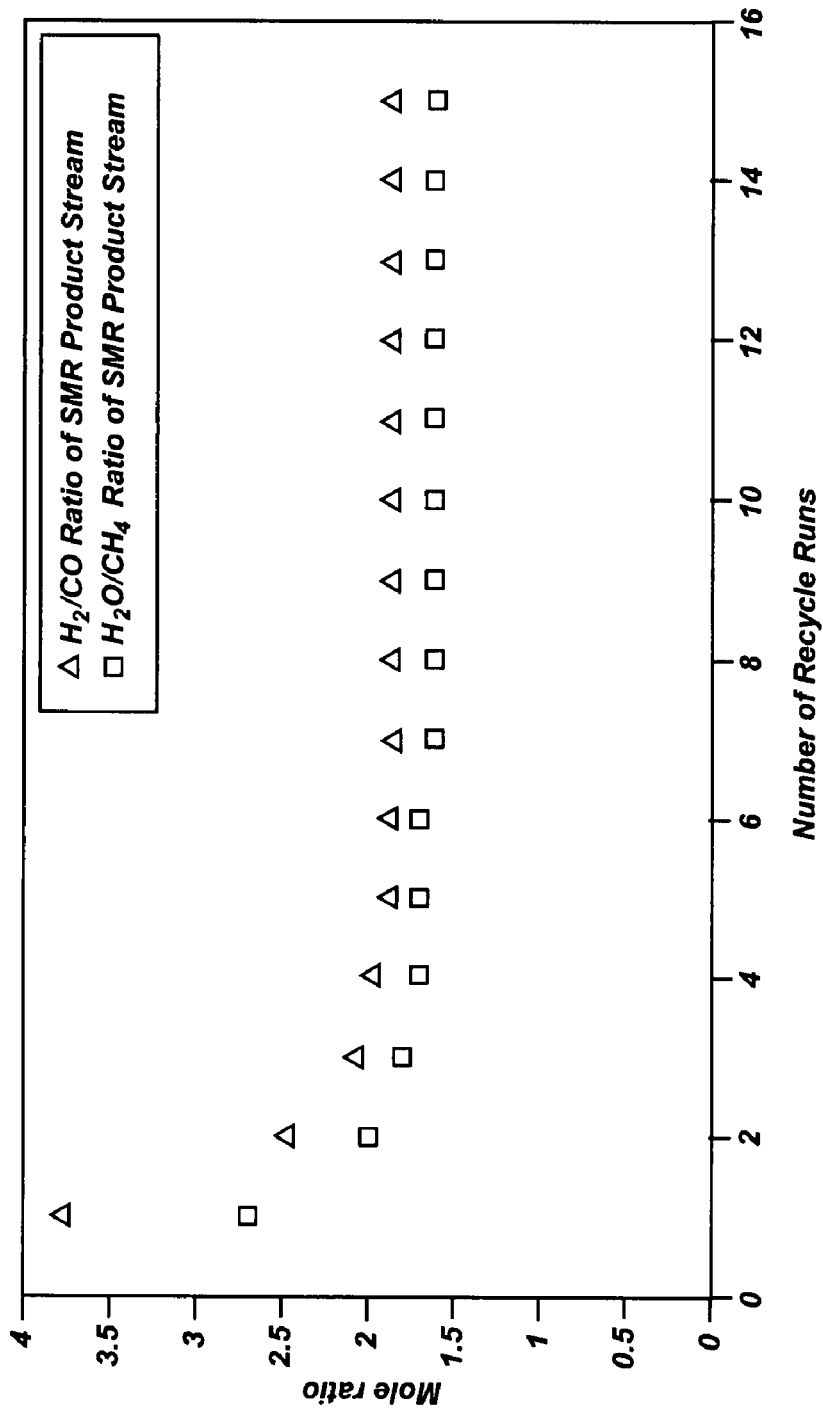
FIG. 6 shows the $H_2/CO$ and $steam/CH_2$ molar ratios for each run in accordance with the second embodiment until after steady values are achieved.

FIG. 6 shows the $H_2/CO$ and steam/$CH_2$ molar ratios for each run until after steady values are achieved. This diagram demonstrates the ability of the process of this preferred embodiment to produce synthesis gas at a desired $H_2/CO$ ratio through controlled recycling of a fraction of the SMR product stream.

In these examples, the filter is operating at 300° C. and 28 atmospheres of pressure. Any filter capable of operating at the process temperature can be used at the gas cleanup station. One such commercially available filter is a candle filter, which is well known to the art. See, for example U.S. Pat. No. 5,474,586, the disclosure of which is incorporated herein by reference. An available gas cleanup unit that can be used in this invention is what is known as a candle filter in which a series of candle-shaped filters are carried in a filter vessel. The candle filters are made of stainless steel metal frit to remove fine particulate matter (ash, inorganic salts and unreacted char) from the gas stream. The slurry is fed into the vessel at a bottom inlet and filtrate is taken out at a top outlet. Particulate matter is taken from another outlet as cake. Sulfur impurities existing in the SHR product gas, mostly in the form of hydrogen sulfide, are removed by passing the product gas through a packed bed of metal oxide sorbents in the gas cleanup unit, particulate matter being taken from a cake outlet.

Active sorbents include, but are not limited to, Zn based oxides such as zinc oxide, sold by Süd-Chemie, Louisville, Ky. Porous metal filter elements are available from Bekaert in Marietta, Ga. in the appropriate forms and sizes, such as Bekpor® Porous Media-which is made from stainless steel sintered fiber matrix with a pore size of 1. These sorbents and filter elements allow the effects of pressure drop and gas-solid mass transfer limitations to be minimized. At a pressure of 28 atm., temperatures in the range of 300° C. to 500° C. and space velocities up to 2000/hr have been used in the desulphurization of SHR product gas. The hydrogen sulfide content of the gas is diminished by means of sulfidation of the sorbents to levels low enough to avoid the deactivation of the SMR catalyst. The used sorbents in the gas cleanup unit can either be replaced with fresh sorbents or regenerated in-situ with diluted air in parallel multiple sorbent beds.

Figure 7:
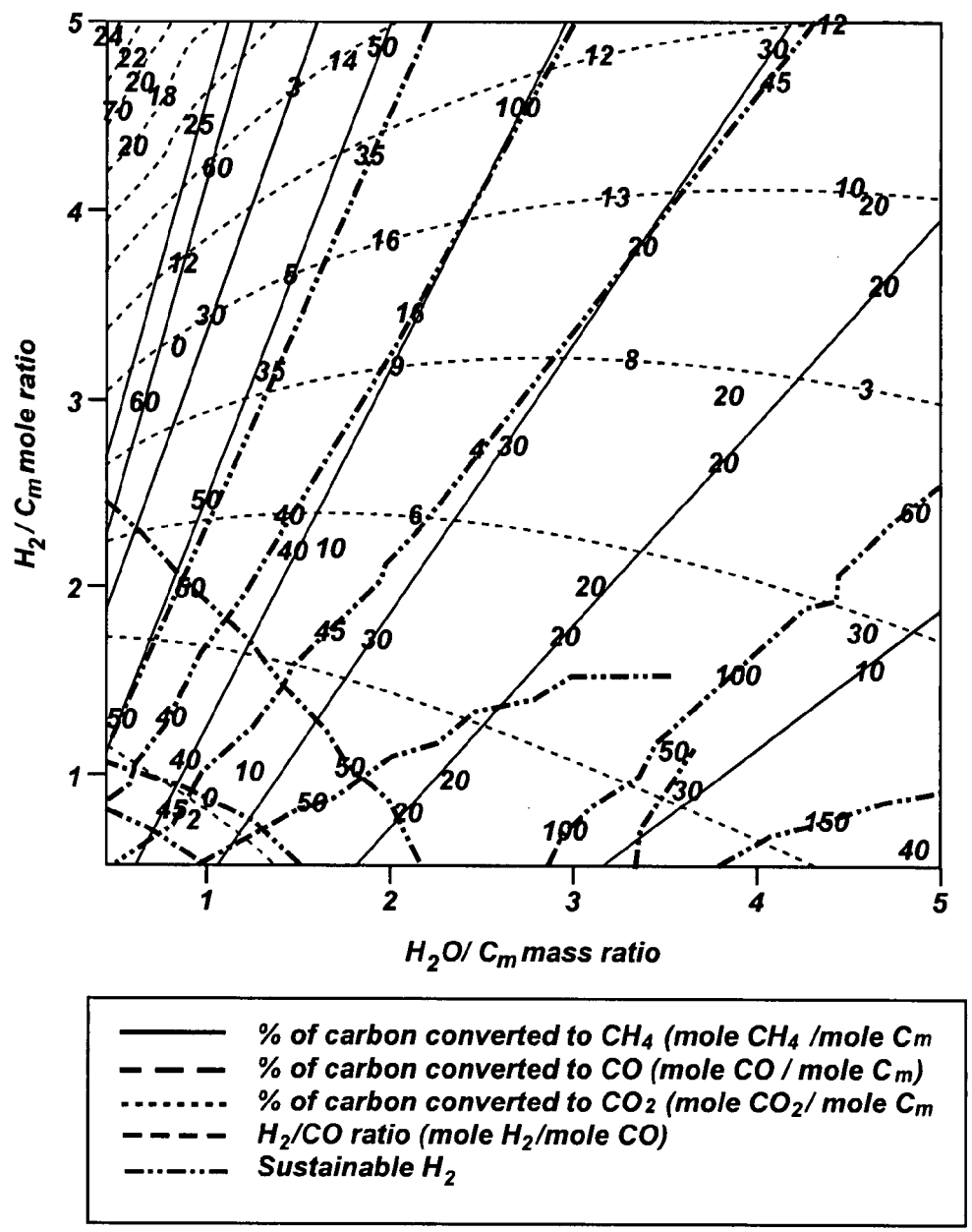
FIG. 7 is a sensitivity analysis using the ASPEN PLUS™ modeling program showing various conversions and the syngas ratio when parameters of solid to water ratio and hydrogen to carbon ratio are varied.

As described, the syngas ratio obtained from the SMR can be adjusted by varying the solid to water ratio and hydrogen to carbon ratio in the SHR feedstock. Sensitivity analysis was performed using the ASPEN PLUS™ equilibrium modeling tool by varying these parameters. The results are in FIG. 7, showing various conversions and the syngas ratio when parameters of solid to water ratio and hydrogen to carbon ratio are varied. The solid line (—) represent the percentage of carbon converted to $CH_4$ (mole $CH_4$/mole $C_{in}$). The long dashed lines (— — —) represent the percentage of carbon converted to CO (mole CO/mole $C_{in}$). The dotted lines ( . . . ) represent the percentage of carbon converted to $CO_2$ (mole $CO_2$/mole $C_{in}$). The dash-dot-dot-dash lines (- . . -) represent sustainable $H_2$, and the short dashed lines (- - -) represent the syngas ratio of $H_2/CO$ (mole $H_2$/mole CO).

The last parameter is of key interest in this invention. FIG. 3 clearly demonstrates that the final syngas ratio can be adjusted by adjusting the water to solid ratio (represented as $H_2O/C_{in}$ mass ratio in FIG. 3) and the hydrogen to carbon ratio of the feedstock. Thus, an optimum composition of the slurry to obtain a sustainable hydrogen feedback and the desired syngas ratio for the Fischer-Tropsch synthesis (2.1:1) was found to be 3.1 when the mole ratio of hydrogen to carbon in the feed was set to one.

More generally, the process of this invention can produce composition of synthesis gas having a $H_2$:CO mole ratio range of 1:1 to 6:1. The resulting effluent is a synthesis of gases rich in hydrogen, carbon monoxide, and steam. Hydrogen produced in the SMR is recycled back to the HGR. Consequently, no outside source of hydrogen is needed to maintain steady state operation. The HGR and SMR processes, therefore, may be considered to be chemically self-sustaining. The remaining synthesis gas is then available for the production of fuels and process heat.

In an embodiment of the invention, the synthesis gas is fed to a Fischer-Tropsch reactor in a process that can produce a zero-sulfur, ultrahigh cetane value diesel-like fuel and valuable paraffin wax products. The absence of sulfur enables low pollutant and particle emitting diesel fuels to be realized. Useful by-products can be produced, foe example, purified water, which can be re-cycled to create the slurry feed into the process. The Fischer-Tropsch reactions also produce tail gas that contains hydrogen, CO, $CO_2$, and some light hydrocarbon gases. Hydrogen can be stripped out of the tail gas and recycled either to the HGR or the Fischer-Tropsch reactor. Any small amounts of other gases such as CO and CO may be flared off.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

REFERENCES

1. Van der Laan, G. P., Thesis, University of Groningen, Netherlands, 1999.
2. Sheldon, R. A., *Chemicals from Synthesis Gas*, 1983 and *FT Technology: Studies in surf Science and Catalysis*, ed. Steynberg, A., Dry, M. E., Vol 152, 2004.

The invention claimed is:

1. A process for converting carbonaceous feed material to synthesis gas and controlling a desired ratio of hydrogen to carbon monoxide in the synthesis gas, comprising:

providing to a steam hydrogasification reactor (a) hydrogen in a first quantity and (b) a slurry formed from a second quantity of water and carbonaceous material;

wherein the first quantity is determined by a first ratio of hydrogen to carbon content in the carbonaceous material, wherein the second quantity is determined by a second ratio of water to solid content in the carbonaceous material;

generating in a steam hydro-gasification reaction a quantity of steam by superheating the water in the slurry and reacting in the steam hydro-gasification reaction the slurry with the hydrogen at a temperature and pressure sufficient to generate a product gas comprising methane, carbon monoxide, and steam;

removing impurities from the product gas;

subjecting the resultant product gas in a steam methane reformer to steam methane reforming with the quantity of steam, wherein the quantity of steam is effective to produce the desired ratio of hydrogen to carbon monoxide in the synthesis gas;

wherein the steam methane reformer obtains the product gas from the steam hydrogasification reactor; and wherein the first and second ratios are adjusted such as to achieve the desired ratio of hydrogen to carbon monoxide in the synthesis gas effluent of the steam methane reformer.

2. The process of claim 1 wherein the hydrogen is obtained by diverting a portion of hydrogen separated from the synthesis gas to the slurry water.

3. The process of claim 1 wherein the hydrogen is obtained by diverting a portion of the synthesis gas to the slurry water, without separation of hydrogen from the synthesis gas.

4. The process of claim 1 wherein at least part of said water is provided in the form of steam.

5. The process of claim 1 wherein the step of adjusting first and second ratios is performed using a sensitivity analysis that relates a ratio of hydrogen to carbon monoxide in synthesis gas to conversion ratios of the carbon content of the carbonaceous material.

6. The process of claim 5 wherein the sensitivity analysis uses a computer-based modeling program.

7. The process of claim 6 wherein the program uses the ASPEN PLUS™ equilibrium process.

8. The process of claim 1 wherein the desired ratio of hydrogen to carbon monoxide in the synthesis gas effluent of the steam methane reformer is between steam methane reforming is conducted under conditions whereby the composition of synthesis gas produced has a H2:CO mole ratio range of 1:1 to 6:1.

9. The process of claim 1 wherein the carbonaceous material comprises municipal waste, biomass, wood, coal, or a natural or synthetic polymer.

10. The process of claim 1 in which synthesis gas generated by the steam methane reforming is fed into a Fischer-Tropsch type reactor under conditions whereby a liquid fuel is produced.

11. A process for converting municipal waste, biomass, wood, coal, or a natural or synthetic polymer, in a water containing slurry to synthesis gas, comprising:

providing hydrogen and water to a steam hydro-gasification reactor, at a predetermined ratio of hydrogen to water, the ratio of hydrogen to water being determined by analysis of the effect on a H2:CO mole ratio in the synthesis gas effluent from a steam methane reformer of (a) the ratio of solid content of the carbonaceous material to the slurry water and (b) the ratio of the hydrogen to carbon content of the carbonaceous material that would produce synthesis gas comprising hydrogen and carbon monoxide at a H2:CO mole ratio range of 1:1 to 6:1;

generating in a steam hydro-gasification reaction a quantity of steam by superheating the water and reacting in the steam hydro-gasification reaction carbonaceous material in the presence of both said hydrogen and water, at a temperature of about 700° C. to about 900° C. and pressure about 132 psi to 560 psi, whereby to generate a product gas comprising steam, methane, and carbon monoxide;

removing impurities from the product gas stream substantially at said temperature and pressure;

subjecting the resultant product gas to steam methane reforming with the quantity of steam under conditions whereby to generate synthesis gas comprising hydrogen and carbon monoxide at a H2:CO mole ratio range of 1:1 to 6:1; and feeding synthesis gas generated by the steam methane reforming into a Fischer-Tropsch type reactor under conditions whereby a liquid fuel is produced;

wherein the steam methane reformer obtains the product gas from the steam hydrogasification reactor.

12. The process of claim 11 wherein the hydrogen is obtained by diverting a portion of hydrogen separated from the synthesis gas to the slurry water.

13. The process of claim 11 wherein the hydrogen is obtained by diverting a portion of the synthesis gas to the slurry water, without separation of hydrogen from the synthesis gas.

14. The process of claim 11 comprising transferring exothermic heat from the Fischer-Tropsch type reaction to the hydro-gasification reaction and/or steam methane reforming reaction.

15. The process of claim 1, wherein the product gas is generated by a process consisting essentially of said simultaneously heating the slurry in the presence of both said hydrogen and water in the hydrogasifier.

* * * * *